(12) United States Patent  
Levola (10) Patent No.: US 8,717,392 B2  
(45) Date of Patent: May 6, 2014

(54) APPARATUS FOR ENABLING USERS TO VIEW IMAGES, METHODS AND COMPUTER READABLE STORAGE MEDIUMS

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 1085 days.

(21) Appl. No.: 12/455,531

(22) Filed: Jun. 2, 2009

(65) Prior Publication Data

US 2010/0302276 A1 Dec. 2, 2010

(51) Int. Cl.
*G09G 5/00* (2006.01)

(52) U.S. Cl.
USPC ............................ 345/677; 351/221; 351/206

(58) Field of Classification Search
USPC ................................... 345/677; 359/567, 569
See application file for complete search history.

(56) References Cited

U.S. PATENT DOCUMENTS

| | | | |
|---|---|---|---|
| 5,142,357 A * | 8/1992 | Lipton et al. | 348/48 |
| 6,191,809 B1 | 2/2001 | Hori et al. | 348/45 |
| 6,507,359 B1 * | 1/2003 | Muramoto et al. | 348/47 |
| 6,552,332 B2 * | 4/2003 | Kusaka et al. | 250/238 |
| 7,206,107 B2 | 4/2007 | Levola | 359/34 |
| 7,229,174 B2 | 6/2007 | Hakkinen | 351/204 |
| 7,460,305 B2 * | 12/2008 | Powell et al. | 359/630 |
| 7,764,413 B2 * | 7/2010 | Levola | 359/15 |
| 2003/0184860 A1 | 10/2003 | Hakkinen | 359/480 |
| 2006/0123182 A1 * | 6/2006 | Sandulescu et al. | 710/316 |
| 2006/0228073 A1 | 10/2006 | Mukawa et al. | 385/31 |
| 2008/0024391 A1 | 1/2008 | Oliver et al. | 345/8 |
| 2008/0100633 A1 * | 5/2008 | Dallas et al. | 345/530 |
| 2008/0218822 A1 * | 9/2008 | Powell et al. | 359/197 |
| 2009/0097122 A1 * | 4/2009 | Niv | 359/575 |
| 2009/0128911 A1 * | 5/2009 | Itzkovitch et al. | 359/575 |
| 2010/0232016 A1 * | 9/2010 | Landa et al. | 359/466 |

FOREIGN PATENT DOCUMENTS

| | | |
|---|---|---|
| WO | WO 2006/058188 A2 | 6/2006 |
| WO | WO 2007/102144 A1 | 9/2007 |
| WO | WO 2007/125257 A1 | 11/2007 |

OTHER PUBLICATIONS

Shechter et al., Compact beam expander with linear gratings, Applied Optics, vol. 41, No. 7, pp. 1236-1240.*

* cited by examiner

*Primary Examiner* — M Good Johnson (74) *Attorney, Agent, or Firm* — Harrington & Smith (57) ABSTRACT

An apparatus including a first expander configured to provide a first image and including a first portion configured to provide a first calibration image; a second expander configured to provide a second image and including a second portion configured to provide a second calibration image; and a controller configured to control alignment of the first image and the second image, a combination of the first calibration image and the second calibration image being useable to control alignment of the first image and the second image.

22 Claims, 5 Drawing Sheets

APPARATUS FOR ENABLING USERS TO VIEW IMAGES, METHODS AND COMPUTER READABLE STORAGE MEDIUMS

FIELD OF THE INVENTION

Embodiments of the present invention relate to apparatus for enabling users to view images, methods and computer readable storage mediums. In particular, they relate to apparatus for enabling users to view images, methods and computer readable storage mediums in portable devices.

BACKGROUND TO THE INVENTION

Apparatus, such as portable devices, may include displays that are configured to be positioned in close proximity to a user's eyes. Such displays are usually referred to as 'near to eye displays'. However, the images provided by the displays may not be aligned for various reasons. For example, the displays may not have been calibrated during manufacturing or the calibration may have been altered due to an impact received during use of the apparatus. A user may develop eye strain using such an apparatus.

It would therefore be desirable to provide an alternative apparatus.

BRIEF DESCRIPTION OF VARIOUS EMBODIMENTS OF THE INVENTION

According to various, but not necessarily all, embodiments of the invention there is provided an apparatus comprising: a first expander configured to provide a first image and including a first portion configured to provide a first calibration image; a second expander configured to provide a second image and including a second portion configured to provide a second calibration image; and a controller configured to control alignment of the first image and the second image, a combination of the first calibration image and the second calibration image being useable to control alignment of the first image and the second image.

According to various, but not necessarily all, embodiments of the invention there is provided an apparatus comprising means for controlling alignment of a first image from a first expander and a second image from a second expander using a combination of a first calibration image from a first portion of the first expander and a second calibration image from a second potion of the second expander.

According to various, but not necessarily all, embodiments of the invention there is provided an apparatus comprising: a first expander configured to provide a first image and including a first portion configured to provide a first calibration image; a second expander configured to provide a second image and including a second portion configured to provide a second calibration image; the first image and the second image being non-overlapping images and the first calibration image and the second calibration image being overlapping images, the first calibration image and the second calibration image having a predetermined relationship with the first image and the second image, and a controller configured to control an angle between, and/or the content of, the first image and the second image for alignment, the first calibration image and the second calibration image being useable to control the angle between, and/or the content of, the first image and the second image.

The apparatus may be for enabling a user to view images.

According to various, but not necessarily all, embodiments of the invention there is provided a portable device comprising an apparatus as described in any of the preceding paragraphs.

According to various, but not necessarily all, embodiments of the invention there is provided a module comprising an apparatus as described in any of the preceding paragraphs.

According to various, but not necessarily all, embodiments of the invention there is provided a method comprising: providing a first expander configured to provide a first image and including a first portion configured to provide a first calibration image; providing a second expander configured to provide a second image and including a second portion configured to provide a second calibration image; and providing a controller configured to control alignment of the first image and the second image, a combination of the first calibration image and the second calibration image being useable to control alignment of the first image and the second image.

According to various, but not necessarily all, embodiments of the invention there is provided a method comprising: controlling alignment of a first image from a first expander and a second image from a second expander using a combination of a first calibration image from a first portion of the first expander and a second calibration image from a second potion of the second expander.

According to various, but not necessarily all, embodiments of the invention there is provided a computer readable storage medium encoded with instructions that, when executed by a processor, perform: controlling alignment of a first image from a first expander and a second image from a second expander using a combination of a first calibration image from a first portion of the first expander and a second calibration image from a second potion of the second expander.

According to various, but not necessarily all, embodiments of the invention there is provided a computer program that, when executed by a processor, performs controlling alignment of a first image from a first expander and a second image from a second expander using a combination of a first calibration image from a first portion of the first expander and a second calibration image from a second potion of the second expander.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
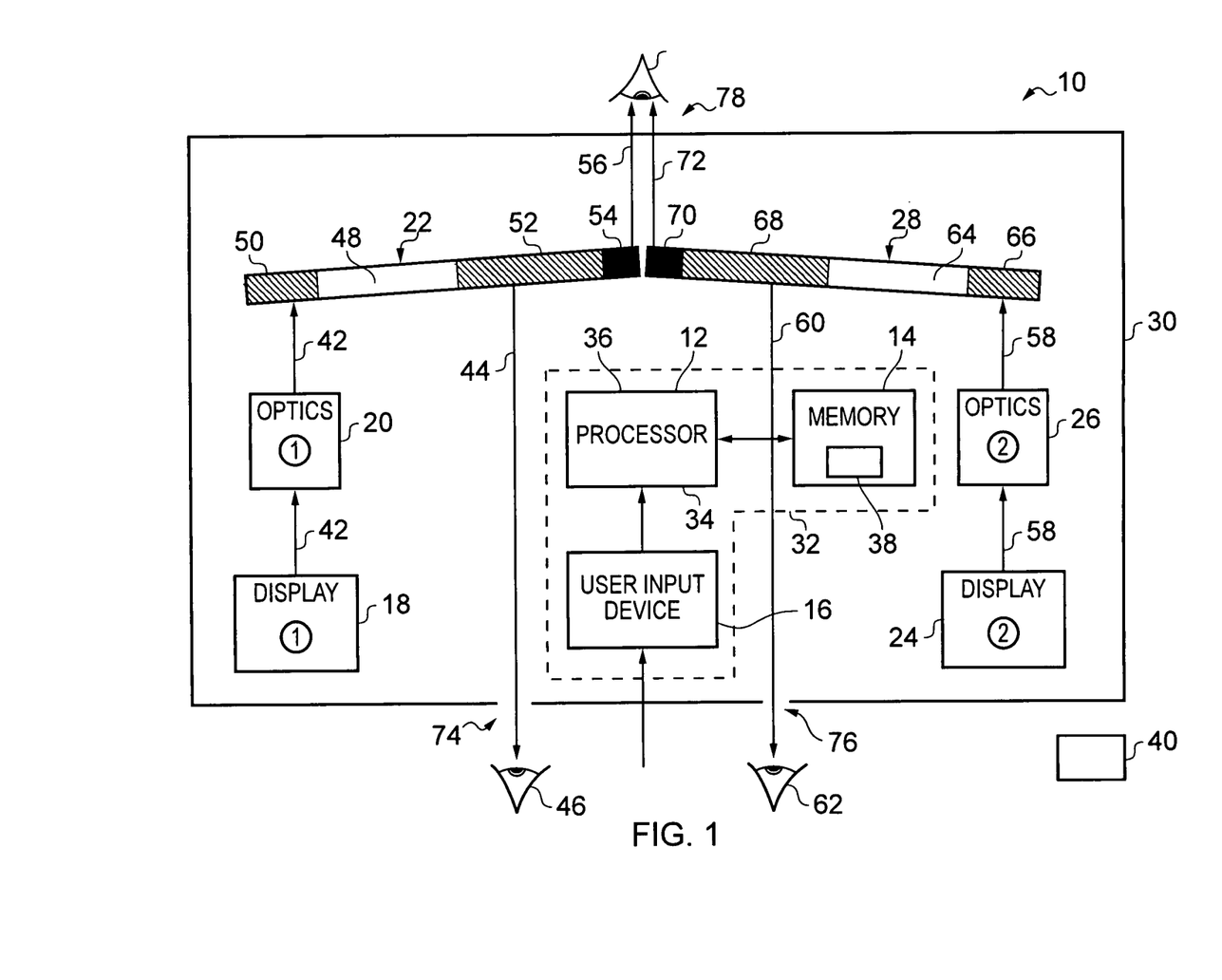
FIG. 1 illustrates a schematic diagram of an apparatus according to various embodiments of the invention.
Figure 3:
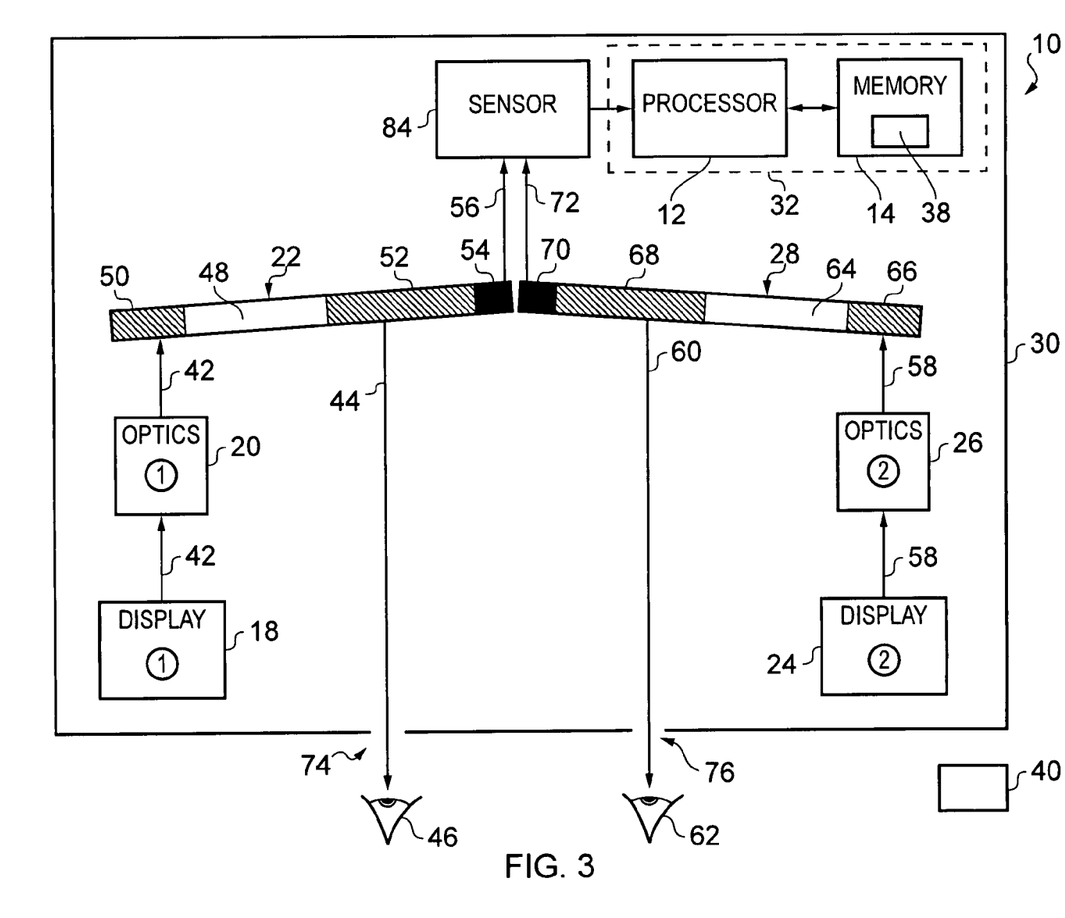
FIG. 3 illustrates a schematic diagram of another apparatus according to various embodiments of the invention.

FIGS. 1 and 3 illustrate an apparatus 10 comprising: a first expander 22 configured to provide a first image 44 and including a first portion 54 configured to provide a first calibration image 56; a second expander 28 configured to provide a second image 60 and including a second portion 70 configured to provide a second calibration image 72; and a controller 32 configured to control alignment of the first image 44 and the second image 60, a combination of the first calibration image 56 and the second calibration image 72 being useable to control alignment of the first image 44 and the second image 60.

In the following description, the wording 'connect' and 'couple' and their derivatives mean operationally connected/coupled. It should be appreciated that any number or combination of intervening components can exist (including no intervening components).

In more detail, FIG. 1 illustrates a schematic diagram of an apparatus 10 according to various embodiments of the invention. The apparatus 10 includes a processor 12, a memory 14, a user input device 16, a first display 18, first optics 20, a first expander 22, a second display 24, second optics 26, a second expander 28 and a housing 30. The processor 12, the memory 14 and the user input device 16 together form a controller 32.

The apparatus 10 may be any device and may be a portable device. The apparatus 10 may be, for example, a mobile cellular telephone, a personal digital assistant (PDA), a portable internet appliance, a hand-held computer, digital video or still camera, wearable computer, computer game device, specialized bring-to-the-eye product for viewing or a module for such devices. As used here 'module' refers to a unit or apparatus that excludes certain parts/components that would be added by an end manufacturer or a user.

The processor 12 may be any suitable processor and may be a microprocessor for example. The implementation of the processor 12 can be in hardware alone (a circuit for example), have certain aspects in software including firmware alone or can be a combination of hardware and software (including firmware).

The processor 12 may be implemented using instructions that enable hardware functionality, for example, by using executable computer program instructions in a general-purpose or special-purpose processor that may be stored on a computer readable storage medium (disk, memory etc) to be executed by such a processor.

The processor 12 is configured to read from and write to the memory 14. The processor 12 may also comprise an output interface 34 via which data and/or commands are output by the processor 12 and an input interface 36 via which data and/or commands are input to the processor 12.

The memory 14 may be any suitable memory and may, for example be permanent built-in memory such as flash memory or it may be a removable memory such as a hard disk, secure digital (SD) card or a micro-drive. The memory 14 stores a computer program 38 comprising computer program instructions that control the operation of the apparatus 10 when loaded into the processor 12. The computer program instructions 38 provide the logic and routines that enables the apparatus 10 to perform the method described below in relation to FIGS. 1, 2A, 2B, 2C. For the apparatus 10 illustrated in FIG. 3, the computer program instructions 38 enable the apparatus 10 to perform the method illustrated in FIG. 4. The processor 12 by reading the memory 14 is able to load and execute the computer program 38.

The computer program instructions 38 provide means for controlling alignment of a first image from the first expander 22 and a second image from a second expander 28 using a combination of a first calibration image from a first portion of the first expander 22 and a second calibration image from a second potion of the second expander 28.

The computer program 38 may arrive at the apparatus 10 via any suitable delivery mechanism 40. The delivery mechanism 40 may be, for example, a computer-readable storage medium, a computer program product, a memory device, a record medium such as a Blue-ray disk, CD-ROM or DVD, an article of manufacture that tangibly embodies the computer program 38. The delivery mechanism 40 may be a signal configured to reliably transfer the computer program 38. The apparatus 10 may propagate or transmit the computer program 38 as a computer data signal.

Although the memory 14 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The user input device 16 is configured to receive an input from a user and provide the input to the processor 12 for processing. The user input device 16 may be any suitable user input device and may be, for example, a keypad, a joystick, a pointing stick, a trackball or a touchpad.

The first display 18 may be any suitable display device and may be a micro-display that may provide full color pixels at more than fifty lines per millimeter. The first display 18 may be, for example, a liquid crystal display (LCD) or an organic light emitting diode (OLED) display. The first display 18 is configured to provide a first image 42 to the first optics 20. The first image 42 comprises electromagnetic radiation having a wavelength that is visible to the human eye (approximately 400 nm to 700 nm).

The first optics 20 may be any suitable optical device for guiding the first image 42 to the first expander 22. The first optics 20 may comprise, for example, one or more lenses. In various embodiments of the invention, the apparatus 10 may not include the first optics 20 and the first image 42 may be provided directly to the first expander 22.

The first expander 22 is configured to receive the first image 42 and provide a first image 44 to a first eye 46 of a user (the left eye of the user for example). The width of the light beam corresponding to the first image 44 is larger than the one corresponding to the image 42. The first expander 22 may be any suitable device for expanding the beam of the first image 42 and may be, for example, a diffractive exit pupil expander (EPE).

The first expander 22 includes a light transmissive substrate 48, a first in-coupling element, 50, that may be diffractive in nature and a first out-coupling element 52 that may also be diffractive in nature. The first out-coupling element 52 includes a first portion 54 that is configured to provide a first calibration image 56. In other embodiments, the first portion 54 may be separated from the first out-coupling element 52. The first portion 54 is provided at one end of the first expander 22 and the first in-coupling element 50 is provided at the opposite end of the first expander 22. The first in-coupling element 50, the first out-coupling element 52 and the first portion 54 may comprise, for example, diffraction gratings that are configured to diffract electromagnetic radiation having visible wavelengths.

In operation, the first image 42 is received and coupled in to the transmissive substrate by the first in-coupling element 50. The light from the first image 42 is thus guided from the first in-coupling element 50 towards the first out-coupling element 52 by total internal reflection within the light transmissive substrate 48. The light from the first image 42 is further coupled out at the first out-coupling element 52 and is directed out of the substrate 48 as the first image 44 and the first calibration image 56.

The second display 24 may be any suitable display device and may be a micro-display that may provide full color pixels at more than fifty lines per millimeter. The second display 24 may be, for example, a liquid crystal display (LCD) or an organic light emitting diode (OLED) display. The second display 24 is configured to provide a second image 58 to the second optics 26. The second image 58 comprises electromagnetic radiation having a wavelength that is visible to the human eye (approximately 400 nm to 700 nm) and includes substantially the same content as the first image 42.

The second optics 26 may be any suitable optical device for guiding the second image 58 to the second expander 28. The second optics 26 may comprise, for example, one or more lenses. In various embodiments of the invention, the apparatus 10 may not include the second optics 26 and the second image 58 may be provided directly to the second expander 28.

The second expander 28 is configured to receive the second image 58 and provide a second image 60 to a second eye 62 of the user (the right eye of the user for example). The width of the light beam corresponding to the second image 60 is larger than the width of the light beam corresponding to the second image 58 and is consequently larger in the user's vision. The second expander 28 may be any suitable device for expanding the light beam of the second image 58 and may be, for example, a diffractive exit pupil expander (EPE).

The second expander 28 includes a light transmissive substrate 64, a second in-coupling element 66, that may be diffractive in nature and a second out-coupling element 68, that may also be diffractive in nature. The second out-coupling element 68 includes a second portion 70 that is configured to provide a second calibration image 72. In other embodiments, the second portion 70 may be separated from the out-coupling element 68. The second portion 70 is provided at one end of the second expander 28 and the second in-coupling element 66 is provided at the opposite end of the second expander 28. The second in-coupling element 66, the second out-coupling element 68 and the second portion 70 may comprise, for example, diffraction gratings that are configured to diffract electromagnetic radiation having visible wavelengths.

In operation, the second image 58 is received and coupled in by the second in-coupling element 66. The second image 58 is guided from the first in-coupling element 66 towards the second out-coupling element 68 by total internal reflection within the light transmissive substrate 64. The second image 58 is further coupled out at the second out-coupling element 68 and is directed out of the substrate 64 as the second image 60 and the second calibration image 72.

The first image 44 and the second image 60 are provided through a first and second aperture 74, 76 respectively in the housing 30 of the apparatus 10. A user is able to place his eyes at the first and second apertures 74, 76 and view the first image 44 with his first eye 46 and the second image 60 with his second eye 62. It should be appreciated that at the first and second apertures 74, 76, the first image 44 and the second image 60 are non-overlapping.

The first calibration image 56 and the second calibration image 72 are provided through a third aperture 78 in the housing 30 of the apparatus 10. As illustrated in FIG. 1, the viewing direction of the first and second calibration images 56, 72 are opposite to the first and second expanded images 44, 60 (one hundred and eighty degrees difference in orientation in this embodiment). Since the first portion 54 and the second portion 70 are positioned adjacent one another with little or no gap therebetween, the first calibration image 56 and the second calibration image 72 substantially overlap one another and form a single image. Consequently, a user is able to view the combination of the first calibration image 56 and the second calibration image 72 through the third aperture 78 with either his first eye 46 or his second eye 62.

The first expander 22 and the second expander 28 are configured so that when the first calibration image 56 and the second calibration image 72 are aligned, the first image 44 and the second image 60 are also aligned in the user's vision. When the first and second calibration images 56, 72 are aligned, the first and second calibration images 56, 72 overlay one another at the position of observation so that they appear to be a single image to the user.

Consequently, a user is able to view the combination of the first calibration image 56 and the second calibration image 72 through the third aperture 78 to determine whether the first image 44 and the second image 60 are aligned. If the combination of the first calibration image 56 and the second calibration image 72 are not aligned (that is, the user views two images through the third aperture 78), the user may operate the user input device 16 to control the alignment of the first and second calibration images 56, 72 (and hence the alignment of the first and second images 44, 60) so that they are aligned.

In operation, the processor 12 receives an input signal from the user input device 16 that indicates how the first calibration image 56 and the second calibration image 72 should move relative to one another so that they overlap when viewed through the third aperture 78. The processor 12 may control the position and/or orientation of the first display 18 and the second display 24 to control alignment of the first calibration image 56 and the second calibration image 72. The processor 12 may alternatively/additionally control the content of the first display 18 and the second display 24 (that is, the image 42, 58 may be shifted in the first display 18 and/or the second display 24) to control alignment. The processor 12 may alternatively/additionally control the position and/or orientation of the first optics 20 and/or the second optics 26 to control alignment.

In other embodiments of the invention, the user input device 16 may be operated by a user to mechanically control the alignment of the first calibration image 56 and the second calibration image 72. The user input device 16 may be mechanically coupled to the first display 18 and/or the second display 24 and/or the first optics 20 and/or the second optics 26 to enable a user to mechanically control the position and/or orientation of the first display 18 and/or the second display 24 and/or the first optics and/or the second optics 26.

Figure 2A:
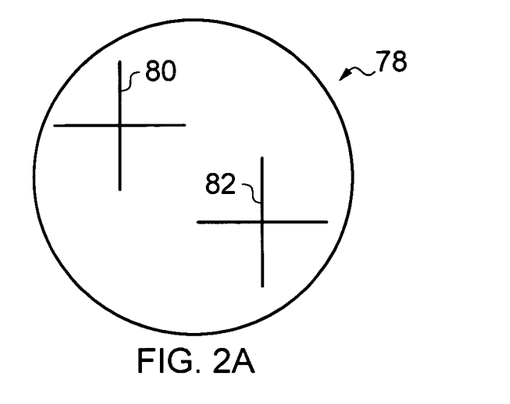
FIG. 2A illustrates a first diagram of a combination of a first calibration image and a second calibration image according to various embodiments of the invention.

FIG. 2A illustrates a user's view of the combination of the first calibration image 56 and the second calibration image 72 through the third aperture 78. In this embodiment, the first calibration image 56 includes a first cross 80 and the second calibration image 72 includes a second cross 82 that may assist a user with calibration. The first cross 80 is positioned in the top left of the user's view and the second cross 82 is positioned in the bottom right of the user's view. Since alignment is achieved when the user views a single cross in the centre of the third aperture 78, the first calibration image 56 and the second calibration image 72 are not aligned in FIG. 2A.

Figure 2B:
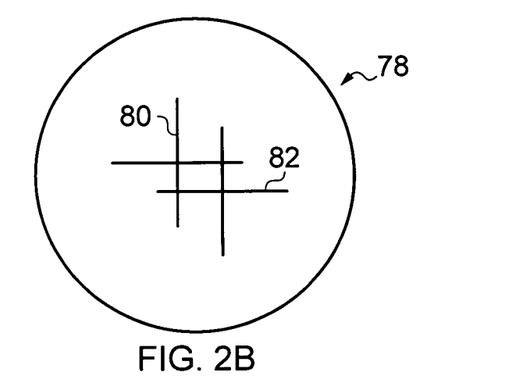
FIG. 2B illustrates a second diagram of a combination of a first calibration image and a second calibration image according to various embodiments of the invention.
Figure 2C:
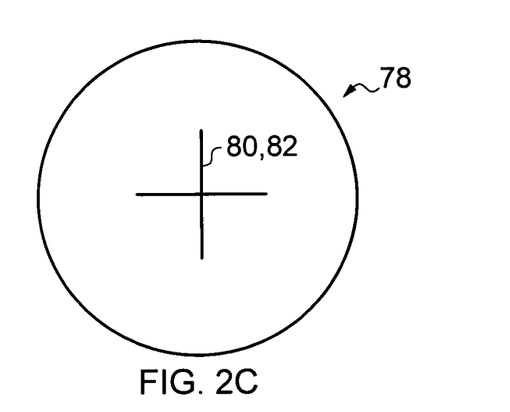
FIG. 2C illustrates a third diagram of a combination of a first calibration image and a second calibration image according to various embodiments of the invention.

The user may then control the user input device 16 so that the first cross 80 and the second cross 82 are brought towards one another but do not overlap (as illustrated in FIG. 2B). The user may provide further input to the user input device 16 so that the first cross 80 and the second cross 82 substantially overlap in the centre of the third aperture (as illustrated in FIG. 2C), indicating that the first and second calibration images 56, 72 (and hence first and second images 44, 60) are aligned.

Embodiments of the present invention provide an advantage in that they enable a user to control the alignment of the first and second images 44, 60 using the combination of the first and second calibration images 56, 72. Since the apparatus 10 may receive impacts during use (from the user for example) which may result in the first and second images 44, 60 not being aligned, embodiments of the invention may enable the user to calibrate the apparatus 10 after each such impact.

FIG. 3 illustrates a schematic diagram of another apparatus 10 according to various embodiments of the invention. The apparatus 10 illustrated in FIG. 3 is similar to the apparatus illustrated in FIG. 1 and where the features are similar, the same reference numerals are used. The apparatus 10 illustrated in FIG. 3 is different to the apparatus illustrated in FIG. 1 in that the apparatus 10 further comprises a sensor 84 and may not include the user input device 16 or the third aperture 78.

The sensor 84 may be any suitable device for detecting electromagnetic radiation and may be, for example, a charge coupled device (CCD) camera or a complementary metal oxide semiconductor (CMOS) camera.

Figure 4:
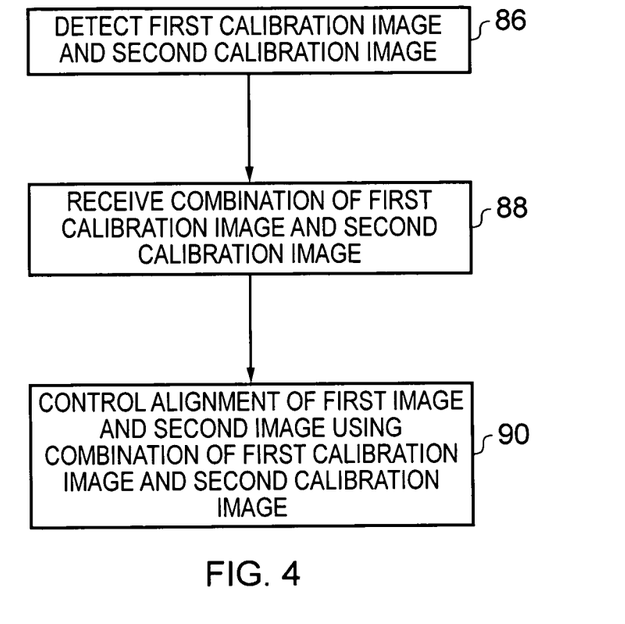
FIG. 4 illustrates a flow diagram of a method of controlling alignment of a first image and a second image according to various embodiments of the invention.

With further reference to FIG. 4, at block 86 the sensor 84 receives and detects the first calibration image 56 and the second calibration image 72 and provides the combination of the first calibration image 56 and the second calibration image 72 to the processor 12 for processing.

At block 88, the processor 12 receives the combination of the first calibration image 56 and the second calibration image 72.

At block 90, the processor 12 controls the alignment of the first image 44 and the second image 60 using the combination of the first calibration image 56 and the second calibration image 72. The processor 12 may automatically control the alignment of the first image 44 and the second image 60 in response to receiving the combination of the first calibration image 56 and the second calibration image 72. In other embodiments, the processor 12 may determine that the first and second images 44, 60 are not aligned and request instructions from the user to confirm that alignment should be carried out.

In various embodiments, the first and second calibration images 56, 72 may comprise crosses 80, 82 as illustrated in FIGS. 2A, 2B, 2C and the processor 12 may use image recognition to determine the positions of the crosses 80, 82. The processor 12 may then determine a vector for each cross 80, 82 that is indicative of the movement required for each cross 80, 82 to reach the centre for example. The processor 12 may then use a look-up table (stored in the memory 14) to determine how to control the displays 18, 24 and/or optics 20, 26 and/or expanders 22, 28. The processor 12 may use the result of the interrogation of the look-up table to control the displays 18, 24 and/or optics 20, 26 to achieve alignment of the first and second images 44, 60.

Embodiments of the invention as illustrated in FIG. 3 may provide an advantage in that the alignment of the first and second images 44, 60 may be carried out by the processor 12 without requiring significant input from the user of the apparatus 10. This may result in the apparatus 10 being simpler to operate for the user.

In one embodiment the first cross 80 and the second cross 82 of the first and second calibration images 56, 72 may have a wavelength that is not visible to human eyesight (infra-red for example). The sensor 84 may be configured to detect the wavelength of the first and second calibration images 56, 72 (infra-red) and provide the combination of the first calibration image 56 and the second calibration image 72 to the processor 12. This embodiment may provide an advantage in that the crosses 80, 82 are substantially invisible to the user and the calibration process may be transparent to the user.

Figure 5:
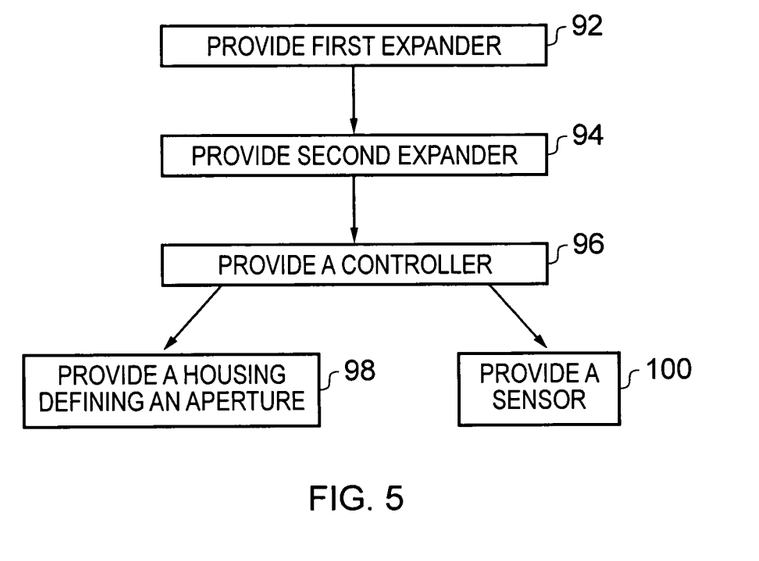
FIG. 5 illustrates a flow diagram of a method of manufacturing an apparatus according to various embodiments of the invention.

FIG. 5 illustrates a flow diagram of a method of manufacturing an apparatus 10 according to various embodiments of the invention. At block 92, the method includes providing, positioning and orienting the first expander 22. At block 94, the method includes providing, positioning and orienting the second expander 28. At block 96, the method includes providing a controller 32 and configuring the controller 12 to be able to control the alignment of the first image 44 and the second image 60 using the combination of the first calibration image 56 and the second calibration image 72. In order to provide an apparatus 10 as illustrated in FIG. 1, the method then includes providing a housing 30 defining a third aperture 78 for housing the first expander 22, the second expander 28 and the controller 32. In order to provide an apparatus 10 as illustrated in FIG. 3, the method then includes providing a sensor 84 for receiving the first calibration image 56 and the second calibration image 72.

The blocks illustrated in the FIGS. 4 and 5 may represent steps in a method and/or sections of code in the computer program 38. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the apparatus 10 may include the features of the apparatus illustrated in FIG. 1 and features of the apparatus illustrated in FIG. 3. In this embodiment, the apparatus 10 may enable a user to align the first and second images 44, 60 using the user input device 16 and may include a sensor 84 for enabling the processor 12 to perform the alignment without user output.

In other embodiments of the invention, the first expander 22 and the second expander 28 may not be diffractive as described above, but may instead be refractive or reflective.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a first expander configured to provide a first image and including a first portion configured to provide a first calibration image;
   a second expander configured to provide a second image that includes substantially the same content as the first image and is distinct from the first image, the second expander including a second portion configured to provide a second calibration image; and
   a controller configured to control an alignment of the first image and the second image, a combination of the first calibration image and the second calibration image being useable to control the alignment of the first image and the second image.

2. An apparatus as claimed in claim 1, wherein the controller includes a user input device configured to enable a user to control the alignment of the first image and the second image.

3. An apparatus as claimed in claim 1, further comprising a housing configured to house the first expander and the second expander, the housing defining an aperture configured to enable a user to view the combination of the first calibration image and the second calibration image.

4. An apparatus as claimed in claim 1, further comprising a sensor configured to receive the first calibration image and the second calibration image and provide the combination of the first calibration image and the second calibration image to the controller.

5. An apparatus as claimed in claim 4, wherein the controller is configured to control the alignment of the first image and the second image using the combination of the first calibration image and the second calibration image from the sensor.

6. An apparatus as claimed in claim 1, wherein the first calibration image and the second calibration image are oriented in a different direction to the first image and the second image.

7. An apparatus as claimed in claim 1, further comprising a first display for providing the first image to the first expander; and a second display for providing the second image to the second expander.

8. An apparatus as claimed in claim 1, wherein the first expander includes a first in-coupling element configured to receive an image and a first out-coupling element configured to provide the first image and wherein the second expander includes a second in-coupling element configured to receive an image and a second out-coupling element configured to provide the second image.

9. An apparatus as claimed in claim 8, wherein the first expander is diffractive or refractive or reflective, and the second expander is diffractive or refractive or reflective.

10. An apparatus as claimed in claim 8, wherein the first portion of the first expander is a portion of the first out-coupling element and the second portion of the second expander is a portion of the second out-coupling element.

11. An apparatus as claimed in claim 8, wherein the first expander and the second expander are Exit Pupil Expanders.

12. A portable device comprising an apparatus as claimed in claim 1.

13. A module comprising an apparatus as claimed in claim 1.

14. A method comprising:
    providing a first expander configured to provide a first image and including a first portion configured to provide a first calibration image;
    providing a second expander configured to provide a second image that includes substantially the same content as the first image and is distinct from the first image the second expander including a second portion configured to provide a second calibration image; and
    providing a controller configured to control an alignment of the first image and the second image, a combination of the first calibration image and the second calibration image being useable to control the alignment of the first image and the second image.

15. A method as claimed in claim 14, wherein the controller includes a user input device configured to enable a user to control the alignment of the first image and the second image.

16. A method as claimed in claim 14, further comprising providing a housing configured to house the first expander and the second expander, the housing defining an aperture configured to enable a user to view the combination of the first calibration image and the second calibration image.

17. A method as claimed in claim 14, further comprising providing a sensor configured to receive the first calibration image and the second calibration image and provide the combination of the first calibration image and the second calibration image to the controller.

18. A method as claimed in claim 17, wherein the controller is configured to control the alignment of the first image and the second image using the combination of the first calibration image and the second calibration image from the sensor.

19. A method comprising:
    controlling an alignment of a first image from a first expander and a second image from a second expander using a combination of a first calibration image from a first portion of the first expander and a second calibration image from a second portion of the second expander, the second image including substantially the same content as the first image and being distinct from the first image.

20. A method as claimed in claim 19, further comprising receiving the combination of the first calibration image and the second calibration image from a sensor.

21. A computer readable storage medium encoded with instructions that, when executed by a processor, perform:
    controlling an alignment of a first image from a first expander and a second image from a second expander using a combination of a first calibration image from a first portion of the first expander and a second calibration image from a second portion of the second expander, the second image including substantially the same content as the first image and being distinct from the first image.

22. A computer readable storage medium as claimed in claim 21, encoded with instructions that, when executed by a processor, perform: receiving the combination of the first calibration image and the second calibration image from a sensor.

* * * * *